United States Patent Office 3,564,076
Patented Feb. 16, 1971

3,564,076
POLYMERS STABILIZED WITH POLYESTERS OF
THIODIPROPIONIC ACID
Otto S. Kauder, Queens, N.Y., assignor to Argus Chemical Corporation, Brooklyn, N.Y., a corporation of Delaware
No Drawing. Continuation-in-part of application Ser. No. 446,422, Apr. 7, 1965, now Patent No. 3,255,136, which is a continuation-in-part of applications Ser. No. 32,087, May 27, 1960, now Patent No. 3,244,650; Ser. No. 36,118, June 15, 1960; and Ser. No. 182,634, Mar. 26, 1962, now Patent No. 3,297,629. This application June 7, 1966, Ser. No. 555,714
Int. Cl. C08f 45/58; C08g 51/58
U.S. Cl. 260—870                           14 Claims

ABSTRACT OF THE DISCLOSURE

Polymeric compositions are provided which have increased stability against deterioration in physical properties over long periods of time due to the presence of polymeric esters of thiodipropionic acid and polyols. The polymeric materials containing the polyesters of thiodipropionic acid and polyols, as well as a process for stabilizing polymeric materials by incorporating such polyesters therein are claimed.

The polyesters of thiodipropionic acid and a polyol have the formula:

$$Z_1[OY]_{n1}[OOCCH_2CH_2SCH_2CH_2COOYO]_{n2}[OCCH_2CH_2SCH_2CH_2COO]_{n3}Z_2$$

in which:

$Z_1$ and $Z_2$ are selected from the group consisting of hydrogen; a polyvalent metal M of Group II of the Periodic Table; a group R selected from the group consisting of hydrocarbon radicals, oxyhydrocarbon radicals, and thiohydrocarbon radicals having from one to twenty carbon atoms; a group $R_3CO$, where $R_3$ is a hydrocarbon or epoxyhydrocarbon group having from one to twenty carbon atoms; and YOH;

Y is selected from the group consisting of bivalent hydrocarbon, oxyhydrocarbon, and thiohydrocarbon groups having from two to twenty carbon atoms. The Y bivalent radical can be for example alkylene, alkenylene, cycloalkylene, alkylene-oxyalkylene, mixed alkylene-cycloalkylene; oxyalkylene; and thioalkylene.

$n_2$ is a number within the range from one to about twenty; $n_1$ and $n_3$ are zero or one, and $n_2+n_3$ is at least two.

SPECIFICATION

This is a continuation-in-part of copending application Ser. No. 446,422, filed Apr. 7, 1965, now U.S. Pat. No. 3,255,136, issued June 7, 1966, which is a continuation-in-part of application Ser. No. 36,118, filed June 15, 1960, now abandoned, Ser. No. 32,087, filed May 27, 1960, now U.S. Pat. No. 3,244,650, issued Apr. 5, 1966; and copending application Ser. No. 182,634, filed Mar. 26, 1962, now U.S. Pat. No. 3,297,629.

This invention relates to the stabilization of polymeric materials against deterioration in physical properties as a result of exposure to light and air, particularly at elevated temperatures, and over long periods of time. In addition, this invention relates to polymeric compositions and especially to vinyl halide polymer and olefin polymer compositions having increased stability against deterioration in physical properties over long periods of time due to the presence of polymeric esters of thiodipropionic acid therein, and to a process of stabilizing polymeric materials, such as vinyl halide polymers and olefin polymers, employing such polymeric esters.

Esters of thiodipropionic acid are now widely recognized as heat stabilizers for olefin polymers. Thus, for example, U.S. Pat. No. 3,033,814 dated May 8, 1962, to Tholstrup, discloses diesters of 3,3'-thiodipropionic acid in combination with an alkylidene bisphenol and a phenyl salicylate; U.S. Pat. No. 2,956,982 dated Oct. 18, 1960, to McCall et al., discloses the addition of alkyl and cycloalkyl diesters of 3,3'-thiodipropionic acid to a reactor during the polymerization of ethylene; U.S. Pat. No. 3,227,676 to Mills et al., dated Jan. 4, 1966, describes dialkyl esters of thiodicarboxylic acid in combination with a bisphenol; British Pat. No. 914,416 published Jan. 2, 1963, discloses monophenols in combination with esters of thiodipropionic acid for polyethylene; British Pat. No. 878,868 dated July 22, 1960, describes the use of diesters of a thiodialkanoic acid with a phenol; U.S. Pat. No. 3,072,604 to Tholstrup, dated Jan. 8, 1963, teaches combinations of diesters of 3,3'-thiodipropionic acid with aminophenols; British Pat. No. 851,670, dated Oct. 19, 1960, suggests alkylidene - bis (alkyl phenols) in combination with a dialkyl ester of thiodipropionic acid; and British Pat. No. 936,494 dated Sept. 11, 1963, relates to stabilizer combinations for polypropylene comprising thiodipropionates, organic triphosphites and thiophenols.

All of these esters of thiodipropionic acid contain a single thiodipropionate group.

Polymeric esters of thiodipropionic acid with polyols, containing two or more thiodipropionate groups and one or more polyol units, are known and are used as plasticizers in resins such as polyvinyl chloride and chloride-acetate copolymers, in amounts ranging upwards from 10 to 50% or more by weight of the resin, Industrial and Engineering Chemistry 45 1060–3 (May, 1963), and U.S. Pat. No. 2,640,848 to Harman, dated June 2, 1953. They have also been suggested for use as plasticizers for cellulose nitrate, methyl methacrylate resins, polyvinyl acetate, polystyrene, and chlorinated rubber; U.S. Pat. No. 2,512,722 to Lanham, dated June 27, 1950, and U.S. Pat. No. 2,612,491 to Evans, dated Sept. 30, 1952.

Such polymeric esters of thiodipropionic acid are also known stabilizers for synthetic lubricants as disclosed in U.S. Pats. Nos. 2,575,195 and 2,575,196, both dated Nov. 13, 1951, and U.S. Pat. No. 2,683,119, dated July 6, 1954, all to Smith.

U.S. Pat. No. 3,255,136, discloses and claims stabilizer combinations for polypropylene consisting essentially of a transesterified reaction product of a phenol and an organic phosphite triester, and an ester of thiodipropionic acid.

In accordance with the instant invention, it has been found that polymeric esters of thiodipropionic acid with polyols when incorporated in small amounts, not exceeding about 5% and preferably less than 2% by weight, in an organic polymer composition impart to the composition a high degree of resistance to oxidative deterioration, and are very much superior in this regard to the nonpolymeric mono and diesters of thiodipropionic acid formed with monohydric alcohols. This stabilizing effect is evidenced in compositions with any organic polymeric material such as, for example, vinyl halide-containing polymers and olefin polymers.

The polymeric esters used herein should have a very low vapor pressure at the working temperature, so that they will not be lost from the mix during hot-working, or during the entire service life of the article. Preferably, they are substantially nonvolatile at this temperature. They also should be compatible with the resin at all temperatures to which the composition is to be subjected, to avoid exudation.

The polymeric esters of thiodipropionic acid of the invention are prepared by condensing two or more moles of thiodipropionic acid with one or more moles of a polyol, i.e., an alcohol containing from two to six hydroxyl groups, and having from two to thirty carbon atoms, optionally with a chain terminating agent to limit molecular weight, such as a monocarboxylic acid, ester or anhydride, and/or a monohydric alcohol or phenol having up to ten carbon atoms. The thiodipropionic acid polymeric ester has a C:S ratio within the range from 8:1 to 66:1, preferably 8:1 to 24:1.

The polymeric esters of thiodipropionic acid and a polyol in accordance with the invention have the following formula:

(I) $Z_1[OY]_{n1}[OOCCH_2CH_2SCH_2CH_2COOYO]_{n2}$
$[OCCH_2CH_2SCH_2CH_2COO]_{n3}Z_2$ in which:

$Z_1$ and $Z_2$ are selected from the group consisting of hydrogen; a polyvalent metal M of Group II of the Periodic Table; a group R selected from the group consisting of hydrocarbon radicals, oxyhydrocarbon radicals, and thiohydrocarbon radicals having from one to twenty carbon atoms; a group $R_3CO$, where $R_3$ is a hydrocarbon or epoxyhydrocarbon group having from one to twenty carbon atoms; and YOH;

Y is selected from the group consisting of bivalent hydrocarbon, oxyhydrocarbon, and thiohydrocarbon groups having from two to twenty carbon atoms. The Y bivalent radical can be for example alkylene, alkenylene, cycloalkylene, alkylene-oxyalkylene, mixed alkylene-cycloalkylene; oxyalkylene; and thioalkylene;

$n_2$ is a number within the range from one to about twenty;

$n_1$ and $n_3$ are zero or one, and $n_2+n_3$ is at least two.

When $Z_1$ and $Z_2$ are hydrogen, the esters are of the type II and III below.

An appropriate chain terminating agent can be used in preparing the above polymeric esters in order to provide Z groups other than COOH or OH, thus giving compounds of the types IV, V and VI below. Thus, for example, compounds IV are obtained using a monohydric alcohol, compounds V using a Group II metal salt or oxide, and compounds VI are obtained using a monobasic carboxylic acid, its ester or anhydride.

Exemplary types of polymeric esters falling within this group thus are:

(II) $HOY[OOCCH_2CH_2SCH_2CH_2COOY]_nOH$ (III) $H[OOCCH_2CH_2SCH_2CH_2COOYO]_{n2}OCCH_2CH_2SCH_2CH_2COOH$ (IV) $R_1[OOCCH_2CH_2SCH_2CH_2COOYO]_nR_2$ (V) $M[OOCCH_2CH_2SCH_2CH_2COOYO]_2OCCH_2CH_2SCH_2CH_2COOM$ (VI) $R_3\underset{\|}{C}OYO[OCCH_2CH_2SCH_2CH_2COOYO]_n\underset{\|}{C}R_3$
$\quad\;\; O \qquad\qquad\qquad\qquad\qquad\qquad\qquad O$ $R_1$ and $R_2$ of IV are hydrogen or an R radical as defined above, such as alkyl, alkenyl, aryl, cycloalkyl, mixed alkyl aryl, mixed alkyl cycloalkyl, aryloxyaryl, alkyloxyalkyl, oxyalkylene and thioalkylene radicals.

M is a polyvalent metal of Group II of the Periodic Table such as zinc, calcium, cadmium, barium, magnesium and strontium. $n$ is a number from two to twenty, and $n_2$ is as above.

The $R_3CO$ group of VI is derived from a nonnitrogenous monocarboxylic acid having from two to about twenty-one carbon atoms, such as aliphatic, aromatic, alicyclic and oxygen-containing heterocyclic monocarboxylic acids as a class. The acids can be substituted, if desired, with groups such as halogen, sulfur, and hydroxyl. The oxygen-containing heterocyclic acid groups include oxygen and carbon in the ring structure, of which alkyl-substituted furoyl groups are exemplary. As exemplary of the acid groups there can be mentioned the following: acetyl, caproyl, 2-ethyl-hexanoyl, lauroyl, chlorocaproyl, hydroxycaproyl, stearoyl, hydroxystearoyl, palmitoyl, oleoyl, miryistoyl, dodecyl thioether propionyl $C_{12}H_{25}$—S—$(CH_2)_2$—COO, hexahydrobenzoyl, benzoyl, phenylacetyl, isobutyl benzoyl, ethyl benzoyl, isopropyl benzoyl, ricinoleoyl, p-t-butylbenzoyl, n-hexyl benzoyl, salicyl, naphthoyl, 1-naphthalene acetyl, ortho benzoyl, naphthenoyl derived from petroleum, abietyl, dihydroabietyl, and methyl furoyl.

The acid group can also contain at least one epoxy group. The remainder of the group can be aliphatic or cycloaliphatic in character, but aromatic and heterocyclic groups can also be present. Typical epoxy-containing acid groups are epoxy stearoyl and epoxy oleoyl, diepoxy stearoyl and epoxy hexahydrobenzoyl.

Typical $R_1$ and $R_2$ radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, hydroxyphenyl, alkylhydroxyphenyl, such as, tert-butylhydroxyphenyl, alkylhydroxyphenoxyalkyl such as, isopropyl hydroxyphenoxypropyl, cyclohexyl, benzyl, cyclopentyl, methylcyclohexyl, ethylcyclohexyl, and naphthenyl, 2-ethoxyethyl, 3-methoxypropyl, 2-phenoxyethyl, p-octyl phenoxyethoxyethyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol.

Typical Y radicals are alkylene radicals such as ethylene, 1,3-propylene; 1,2-propylene; 1,4-butylene; 1,5-pentylene; 2,4-dimethyl-pentylene-1,2; 2,3-butylene; 1,3-butylene; 2-ethylhexylene-1,3; 1,8-octylene; 1,10-decylene; 1,12-dodecylene; 2,4-hexylene, 2,2,4-trimethylpentylene-1,3; and 9-octadecene-1,12-diyl; ethylenoxyethylene; ethylenoxyethylenoxyethylene; tetramethylene; hexamethylene; decamethylene; alkyl-substituted alkylene radicals such as

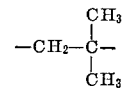

and

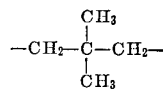

arylene radicals such as dimethylene phenylene,

and alicyclylene such as cyclohexylene

and cyclopentylene

The R and Y radicals of these esters are important in furnishing compatibility with polymeric materials, e.g., polyproylene. Where Y is rather low in molecular weight, the R radical is selected so as to compensate for this, in obtaining the optimum compatibility and nonvolatility.

As exemplary of the polymeric esters of thiodipropionic acid, there can be mentioned the following: the polymeric ester of ethylene glycol and thiodipropionic acid, the polymeric ester of diethylene glycol and thiodipropionic acid, the polymeric ester of triethylene glycol and thiodipropionic acid, the polymeric ester of 1,3-propylene glycol and thiodipropionic acid, the polymeric ester of 1,3-butanediol and thiodipropionic acid, the polymeric ester of 1,4-butanediol and thiodipropionic acid, the polymeric esters of 2,2-diethylpropanediol-1,3 and thiodipropionic acid, and 2-ethyl-2-methylpropanediol-1,3 and thiodipropionic acid, the polymeric ester of 2-ethyl-2-propylpropanediol-1,3, and thiodipropionic acid, the polymeric ester of 2-ethyl-2-butylpropane-diol-1,3 and thiodipropionic acid, the polymeric esters of 1,1-; 1,2-; 1,3-; and 1,4-cyclohexanedimethanol and thiodipropionic acid, the polymeric ester of hexamethylene glycol and thiodipropionic acid, the polymeric ester of neopentyl glycol and thiodipropionic acid, the polymeric ester of pentaerythritol and thiodipropionic acid, the polymeric ester of 1,5-pentanediol and thiodipropionic acid, the polymeric ester of 1,3-hexane-diol and thiodipropionic acid, the polymeric ester of octamethylene glycol and thiodipropionic acid, the polymeric ester of β,β-thiodiethanol and thiodipropionic acid, the polymeric ester of 2,2,4-trimethyl-hexanediol-1,6 and thiodipropionic acid, the polymeric ester of 1,10-decanediol and thiodipropionic acid, and the polymeric esters of 1,2-; 1,3-; or 1,4-α,α'-xylenediol and thiodipropionic acid.

The following polymeric esters are exemplary of those coming within the invention:

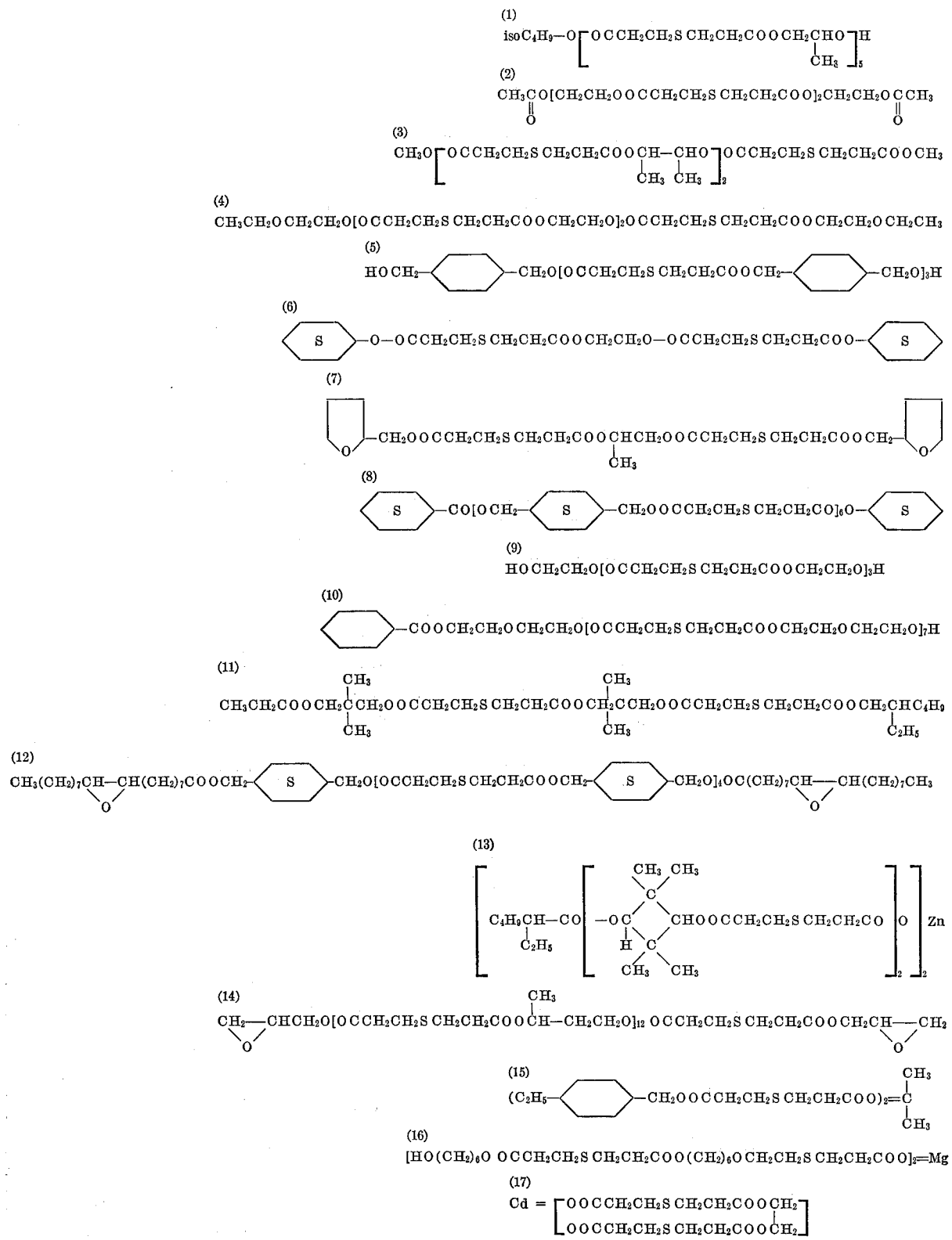

(18)
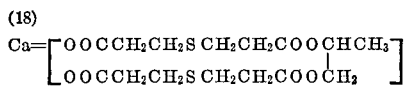

(19)
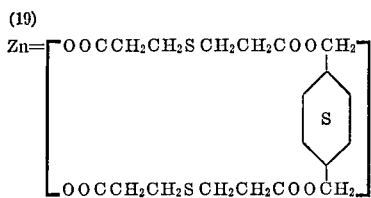

(20)
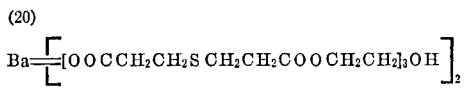

(21)
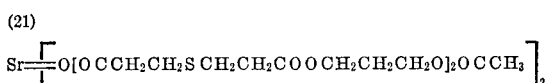

(22)
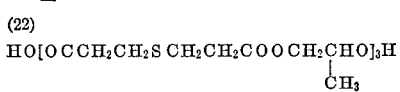

(23)
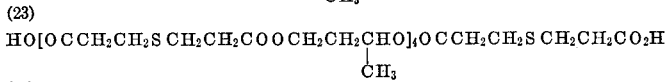

(24)
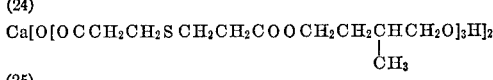

(25)
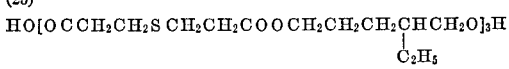

The polymeric esters of thiodipropionic acid employed in this invention can be prepared by conventional esterification of the thiodipropionic acid, acid halide or anhydride, or an ester thereof, with a polyhydric alcohol, and optionally a chain terminating agent as described hereinbefore. Suitable esterification conditions for the acid and anhydride are a temperature of from 100 to about 250° C. and for about 2 to 16 hours. An esterification catalyst or transesterification catalyst can be employed, if desired, such as sulfonic acid catalysts, for example, p-toluene sulfonic acid, benzenesulfonic acid, polystyrene sulfonic acid, methanesulfonic acid, ethanesulfonic acid, and sulfamic acid, alkaline catalysts such as calcium hydroxide, sodium hydroxide, potassium alkoxide, salt catalysts such as zinc acetate, dibutyl tin oxide, stannous laurate. The reaction can be conducted in an inert solvent such as xylene or kerosene. The water of reaction can be removed from the reaction product by use of a Dean-Stark water trap. The crude reaction product can be purified by adding an alkaline compound such as calcium hydroxide, sodium bicarbonate, or potassium carbonate, thereto to neutralize the product and then steam stripping the mixture, or by filtration with diatomaceous earth or charcoal.

Typical polyols that can be suitably employed are ethylene glycol,
neopentyl glycol,
diethylene glycol,
triethylene glycol,
1,2- and 1,3-propylene glycol,
1,3-; 2,3- and 1,4-butanediol,
1,5-pentanediol,
1,6-hexanediol,
2,2-diethylpropanediol-1,3,
2-ethyl-2-butylpropanediol-1,3,
2-ethyl-2-methylpropanediol-1,3,
2-ethyl-2-propylpropanediol-1,3,
2,2,4-trimethylhexanediol-1,6,
1,10-decanediol,
1,2-α,α'-xylenediol,
β,β'-thiodiethanol,
1,3-α,α'-xylenediol,
1,4-α,α'-xylenediol,
1,1-; 1,2-; 1,3 and 1,4-cyclohexanedimethanol,
glycerol,
trimethylolethane,
trimethylolpropane,
trimethylolbutane,
pentaerythritol,
dipentaerythritol,
and the like.

Of these, the preferred glycols to be used in the present invention are neopentyl glycol, ethylene glycol, 1,4-cyclohexanedimethanol, diethylene glycol, 1,3-butanediol, and 1,5-pentanediol.

The preparation of polymeric esters of thiodipropionic acid employed in this invention is illustrated in Examples A to G.

EXAMPLE A

A polymeric ester of thiodipropionic acid and 1,6-hexanediol was prepared as follows:

118.7 g. thiodipropionic acid, (0.67 mole), and 86.7 g. 1,6-hexanediol, (0.733 mole), representing a 10% excess of the diol over the acid, were stirred and heated in a 500 cc. flask fitted with a reflux condenser, addition funnel and water refluxing trap. The refluxing trap was filled with xylene. The reaction mixture was stirred and heated under reflux for about four hours during which time the temperature of the reaction mixture rose from 134° C. to 202° C. The temperature of the reaction mixture was controlled in the range of 200 to 202° by occasionally adding xylene thereto.

After the four hour reaction time, a total of 24 ml. of water which is approximately the theoretically expected quantity for complete esterification of the acid had accumulated in the water trap and the reaction was stopped. The acid number of the reaction mixture at this point was 10.3. The condenser was then set for downward distillation and the xylene removed by distillation at 20 mm. of pressure to a final pot temperature of 162° C. The remaining product was poured out of the reaction flask into a flat aluminum pan and allowed to solidify at room temperature. The yield of white material was 180.9 g. out of a theoretically expected 181.3 g. melting in the range 55 to 62° C., having a molecular weight of 1100±40.

The product was a hard friable solid, the hydroxyl-terminated product of the type of II.

EXAMPLE B

A polymeric ester of thiodipropionic acid and triethylene glycol of type II was prepared as follows:

89 g. thiodipropionic acid (0.5 mole), and 90 g. triethylene glycol (0.6 mole), representing a 20% excess of the glycol over the acid, were stirred and heated as described in Example A.

After the four-hour reaction time, a total of 18.1 ml. of water, which is approximately the theoretically expected quantity for complete esterification, had accumulated in the water trap and the reaction was stopped. The acid number of the reaction mixture at this point was 12.4. Xylene was removed from the reaction product by distillation. The remaining product was a light yellow viscous liquid which upon solidifying yielded a glassy material melting in the range from −5 to −10° C. and was 149.5 g. out of a theoretically expected 151 g.

EXAMPLE C

A polymeric ester of thiodipropionic acid and diethylene glycol of type II was prepared as follows:

178 g. thiodipropionic acid (1.0 mole) and 119 g. diethylene glycol (1.12 mole), representing a 12% excess of the glycol over the acid, were stirred and heated as described in Example A.

After the 5-hour reaction time, a total of 36.4 ml. of water which is approximately the theoretically expected quantity had accumulated in the water trap and the reaction was stopped. The acid number of the reaction mixture at this point was 16.1. The xylene was removed by distillation and the remaining product was a light yellow viscous liquid which upon cooling yielded 258 g. of a glassy material melting in the range of −5 to 0° C. The theoretical yield expected was 261 g.

EXAMPLE D

A polymeric ester of thiodipropionic acid and neopentyl glycol, containing iso-decyl chain end groups and thus of type IV, was prepared as follows:

356 g. thiodipropionic acid (2 moles), 104 g. neopentyl glycol (1 mole), 348 g. isodecyl alcohol (2.2 moles) and 0.80 g. p-toluene sulfonic acid, used as an esterification catalyst, were stirred and heated in a 500 cc. flask fitted with a reflux condenser, addition funnel and water refluxing trap. The reaction mixture was stirred and heated under reflux for about 7 hours at a temperature within a range from about 130 to about 179° C. The amount of water collected after the 7 hour period was 65 cc. out of a theoretically possible 72 cc. At the end of the reaction period, the esterification catalyst was neutralized by adding 0.64 g. potassium carbonate to the reaction mixture, and the reaction mixture was steam stripped under reduced pressure to a final pot temperature of 175° C. The final product was 743 g. of a moderately viscous liquid and had an acid number of 3.2 and was identified as the polymeric ester of thiodipropionic acid and neopentyl glycol having iso-decyl chain end groups.

EXAMPLE E

A polymeric ester of thiodipropionic acid and neopentyl glycol, containing n-dodecyl end groups and thus type IV, was prepared as follows:

356 g. thiodipropionic acid (2 moles), 104 g. neopentyl glycol (2 moles), 819 g. n-dodecyl alcohol (5.18 moles) and 2.7 g. p-toluene sulfonic acid were reacted for four hours at a reaction temperature ranging from 109 to 160° C. After the reaction time, a total of 73 cc. out of a total of 72 cc. theoretically possible, was collected. The apparent water output greater than theoretically expected can be explained as involving the volatilization of some of the neopentyl glycol, and possibly some n-dodecyl alcohol. After neutralization of the reaction product as described in Example D, steam stripping gave a large amount of unreacted dodecyl alcohol and yielded 540 g. of a viscous liquid product having an acid number of 0.6, a molecular weight of about 685, and which was identified as the polymeric ester of thiodipropionic acid and neopentyl glycol having n-dodecyl end groups.

EXAMPLE F

A polymeric ester of thiodipropionic acid and ethylene glycol with pelargonic acid chain termination and thus of type VI was prepared as follows:

89 g. thiodipropionic acid (0.5 mole), 68 g. ethylene glycol (1.1 mole) and 158 g. pelargonic acid (1.0 mole) are reacted for eight hours at a reaction temperature ranging from 110 to 160° C. At the end of the reaction time about 37.2 g. of water is collected. After neutralization of the reaction product as described in Example D, steam stripping gives 275 g. of product having an acid value of about 21 and a molecular weight of about 560.

EXAMPLE G

A salt of a polymeric ester of thiodipropionic acid and 1,6-hexanediol was prepared as follows:

178 g. thiodipropionic acid, (1 mole), and 89.5 g. 1,6-hexanediol, (0.75 mole), were stirred and heated in a 500 cc. flask fitted with a reflux condenser, addition funnel and water refluxing trap. The refluxing trap was filled with xylene. The reaction mixture was stirred and heated under reflux for about four hours during which time the temperature of the reaction mixture rose from 134° C. to 202° C. The temperature of the reaction mixture was controlled in the range of 200 to 202° by occasionally adding xylene thereto.

After the four hour reaction time, a total of 27 ml. of water which is approximately the theoretically expected quantity for complete esterification of the diol had accumulated in the water trap, and the reaction was stopped. The acid number of the reaction mixture at this point was 116. Zinc oxide, 18 g. (90% of the calculated quantity for complete neutralization of this acidity) was added, and heating continued until the zinc oxide had dissolved (5 hours). The condenser was then set for downward distillation and the xylene removed by distilling over 20 mm. of pressure to a final pot temperature of 162° C. The remaining product was poured out of the reaction flask into a flat aluminum pan and allowed to solidify at room temperature.

The product was a hard friable solid, the zinc salt of the acid-terminated product of the type of V.

EXAMPLE H

A salt of a polymeric ester of thiodipropionic acid and dipropylene glycol was prepared as follows:

89 g. thiodipropionic acid (0.5 mole), and 40.2 g. dipropylene glycol (0.3 mole) were stirred and heated in a 500 cc. flask fitted with a reflux condenser, additional funnel and water refluxing trap. The refluxing trap was filled with xylene. The reaction mixture was stirred and heated under reflux for about four hours during which time the temperature of the reaction mixture rose from 134° C. to 202° C. The temperature of the reaction mixture was controlled in the range of 200 to 202° by occasionally adding xylene thereto.

After the four hour reaction time, a total of 10.3 ml. of water which is approximately the theoretically expected quantity for complete esterification of the diol had accumulated in the water trap, and the reaction was stopped. Cadmium oxide, 12.8 g. (0.1 mole) (50% of the calculated quantity for complete neutralization of the acid) was added, and heating continued at 150–175° C. until the cadmium oxide had dissolved (5 hours). There was then added 0.1 mole (18.9 g.) of barium hydroxide monohydrate, and reaction continued at this temperature until the mixture had solidified. The condenser was then set for downward distillation and the xylene removed by distilling over 20 mm. of pressure to a final pot temperature of 175 °C.

The product was a hard friable solid, the mixed barium-cadmium salt of the acid-terminated product, of the type of V.

The polymeric esters of this invention find important utility as stabilizers in a wide variety of polymeric materials subject to degradation upon prolonged exposure to heat and light. Such polymeric materials include natural and synthetic linear and cross-linked polymers which are subject to heat and ultra-violet light deterioration.

Optionally, additional stabilizers can be used, such as the monohydric, polyhydric, monocyclic, or polycyclic phenols, organic phosphites, organic phosphorous acids, and/or polyvalent metal salts of organic acids, and/or organotin salts or half esters of $\alpha,\beta$-unsaturated dicarboxylic acids and alcohols having from one to two hydroxyl groups. A synergistic effect is obtained when the polymeric esters are used in combinations with the aforesaid stabilizers in various combinations thereof. The classes and examples of such phenols, organic phosphites and polyvalent metal salts which can be employed herein are set out in copending application Ser. No. 446,422, now U.S. Pat. No. 3,255,136 and copending application Ser. No. 238,733, filed Nov. 19, 1962, and copending application Ser. No. 182,634, filed Mar. 26, 1962, and such disclosures are incorporated herein by this reference thereto.

In addition, ultraviolet light stabilizers can be employed herein such as the 2-hydroxybenzophenones, hydroxyaryl benzotriazoles, aryl salicylates, glyoximes, and various nickel compounds such as nickel thiobisphenols, nickel phosphites and nickel glyoximes. These are well known compounds, and they can be employed with the polymeric esters with or without additional stabilizers, such as phenols and any of the other compounds described hereinbefore, to enhance the resistance of various polymers to deterioration due to light.

When employed in polymeric materials such as vinyl halide polymers and olefin polymers, a sufficient amount of the polymeric ester stabilizer is used to improve the stability against deterioration in physical properties, including, for example, embrittlement, under the conditions to which the vinyl halide polymer or olefin polymer will be subjected. Very small amounts are usually adequate. Amounts within the range from about 0.005 to about 5% total of the polymeric ester by weight of the polymeric material are satisfactory. Preferably, from 0.05 to 2% is employed for optimum stabilization.

Where stabilizer combinations are employed, the total amount of stabilizers should be less than 10% of the polymeric material, and preferably less than 5%, and they can contain from about 0.025 to about 1% of the phenol, from about 0.05 to about 5% of the phosphite, from about 0.025 to about 3% of the polyvalent metal salt and/or organotin compound, and from about 0.005 to about 1% of the organic phosphorous acid, where these are present, in any combination. The light stabilizer, if used, would be present in an amount from about 0.005 to about 5%, preferably from about 0.05 to about 2%.

Where the polymeric material is polyvinyl chloride, the preferred amounts are from about 0.1 to about 0.5% of the polymeric ester of thiodipropionic acid, with from about 0.1 to about 3% of polyvalent metal salt and/or alkyl tin compound and/or from about 0.1 to about 5% organic phosphite, and/or from about 0.025 to about 1% phenol, when present.

Where the polymeric material is a polyolefin, the preferred amounts are from about 0.1 to about 1% by weight of the polymeric ester of thiodipropionic acid, with from 0.025 to about 0.75% polyvalent metal salt and/or from about 0.05 to about 1.25% organic phosphite and/or from about 0.025 to about 0.5% phenol, when present.

Where the polymeric material is an unsaturated polyester-vinyl monomer, the preferred amounts are from about 0.01 to about 0.3% of the polymeric ester of thiodipropionic acid with from about 0.005 to about 0.05% phenol, and/or from about 0.05 to about 1.25% organic phosphite, when present.

Where the polymeric material is a polyurethane, the preferred amounts are from about 0.5 to about 2% of the polymeric ester of thiodipropionic acid, with from about 0.025 to about 0.75% polyvalent salt and/or organotin compound, and/or from about 0.1 to about 5% organic phosphite and/or from about 0.025 to about 1% phenol, when present.

The stabilizer system containing the polymeric ester and any other stabilizers can be formulated as a simple mixture for incorporation in the polymer by the polymer manufacturer or by the converter. An inert organic solvent can be used to facilitate handling, if the ingredients do not form a homogeneous mixture or solution.

Where a phenol and a phosphite are used, any difficulty in compatibility of the phosphite and the phenol is no problem if the mix is to be incorporated directly in the polymer. If the stabilizer system is to be sold as such, the compatibility can be improved by heating the phosphite and phenol at an elevated temperature for a sufficient time to form a homogeneous solution. This solution is quite stable at ambient temperatures and even below. Temperatures of from 100 to 200° C. can be used, under reflux if necessary. A small amount, from 0.02 to 1%, of an alkali or alkaline earth metal, as such or in the form of a compound which forms a salt with the phenol, such as the metal, the oxide or hydroxide, such as sodium hydroxide, potassium hydroxide, calcium oxide and calcium hydroxide, or the phenolate such as sodium phenolate, should be present to expedite the reaction, which is believed to be a transesterification of phosphite ester with the phenol, due to the fact that the alcohol or phenol that would be liberated by hydrolysis of the phosphite can be distilled out of the reaction mixture. The reaction will proceed without distillation of the hydrolysis reaction product from the mixture up to an equilibrium point, short of completion. Transesterification need not be complete; only a little, involving perhaps ⅓ of the phosphite ester groups of a triphosphite and ½ of the phenol groups of a dihydric phenol on a mole-for-mole basis, is enough to make phosphite and phenol compatible, and stripping is unnecessary to effect a transesterification to this extent.

Polymeric materials with which the polymeric esters are advantageously employed can be either thermoplastic or thermosetting, and include those which are produced by addition polymerization and by condensation.

An important class of polymers which are beneficially modified according to the invention are those obtained from a polymerizable monomeric compound having ethylenic unsaturation. Such monomers have the general formula $H_2C{=}C{<}$, wherein the ethylenic group is substituted by a member of the group consisting of hydrogen, halogen, alkyl, aryl, aralkyl, alkaryl, alkenyl, alkynyl, cycloalkyl, haloalkyl, haloaryl, haloaralkyl, haloalkaryl, haloalkenyl, haloalkynyl, carboalkoxy, and cyano. Specific examples, of the above radicals are methyl, ethyl, propyl, butyl, phenyl, tolyl, xylyl, 4-ethylphenyl, benzyl, 2-phenylethyl, vinyl, propenyl, butenyl, ethynyl, propynyl, butynyl, cyclopentyl, 2-methylcyclopentyl, cyclohexyl, chloro, fluoro, bromo, iodo, 2-chloroethyl, chlorovinyl, 1,2-dichloroethyl, 2-chlorophenyl, 2 - (4 - chlrophenyl) ethyl, 4-bromobenzyl, 3-chloropropenyl, ethoxy, methoxyethyl, vinyloxy, allyloxy, carbomethoxy, carboethoxy, acetyl, propionyl, cyano, formyl, acetoxy, propionoxy, carboxy.

Polypropylene solid polymer can be defined in a manner to differentiate it from other polyolefins as having a density within the range of from 0.86 to 0.91 and a melting point above 150° C. The polymeric esters are applicable to all such polypropylenes, as distinguished from polypropylenes in the liquid form or in semiliquid or gel-like forms, such as are used as greases and waxes.

The polymeric esters are applicable to polypropylenes prepared by any of the various procedures, for the molecular weight and tacticity are not factors affecting this stabilizer system. Isotactic polypropylene, available commercially under the tradenames Pro-Fax, Escon and Olefane and having a softening or hot-working temperature of about 350° F., is an example of a sterically regular polypropylene polymer.

Mixtures of polypropylene with other compatible polymers and copolymers of polypropylene with copolymerization monomers not reactive with the polypropylene stabilizer combination also can be stabilized, for example, mixtures of polyethylene and polypropylene, and copolymers of propylene and ethylene. However, any of the normally solid polymers of α-monoolefinic aliphatic hydrocarbons containing from about two to about ten carbon atoms can be stabilized in accordance with the present invention. The preferred polymers are polyethylene and polypropylene, although such poly-α-olefins as poly-1-butene, poly(3-methyl - butene-1), poly (4-methyl-pentene-1), poly(pentene-1), poly(3,3 - dimethylbutene-1), poly(4,4-dimethylbutene-1), poly(octene-1), poly(octadecene-1), and the like, can also be stabilized with the polymeric esters. Both so-called "low density" and "high density" or high crystallinity poly-α-olefin compositions can be stabilized in accordance with the invention.

The stabilizer of the present invention is especially useful for stabilizing the solid resinous poly-α-olefins having average molecular weights (as determined by inherent viscosity measurements), of at least 15,000 and more usually at least 20,000, although the stabilizer of the present invention can also be utilized to stabilize the so-called poly-α-olefin waxes having lower average molecular weights of usually 3,000 to 12,000.

Polymers of vinyl and vinylidene compounds, i.e., those having the $CH_2=C<$ radical are, e.g., polymers of the alkenes, such as ethylene, propylene, isobutylene; acrylyl and alkacrylyl compounds such as acrylic, chloroacrylic and methacrylic acids, anhydrides, esters; nitriles, for example, acrylonitrile, the vinyl and vinylidene halides such as vinyl chloride, vinyl fluoride, vinylidene fluoride and 1-chloro-1-fluoro-ethylene, polyvinyl alcohol; the vinyl carboxylates such as vinyl acetate, vinyl chloroacetate, vinyl propionate, the vinyl aromatic hydrocarbon compounds such as styrene, α-methylstyrene, 2,4-dichlorostyrene, α- or β-vinylnaphthalene, divinylbenzene and vinylfluorene; the vinyl ethers such as ethyl vinyl ether or isobutyl vinyl ether. Homopolymers of the above compounds or copolymers or terpolymers as well as blends thereof are beneficially modified by the polymeric esters. Examples of such copolymers or terpolymers are those obtained by polymerization of the following monomer mixtures: ethylene, propylene, vinyl chloride-methacrylate; cyclohexyl methacrylate-vinyl chloroacetate, acrylonitrile-vinylidene cyanide, methyl methacrylate-vinyl acetate, vinyl chloride-vinylidene chloride-vinyl acetate, etc.

The term "polyvinyl chloride" as used herein is inclusive of any polymer formed at least in part of the recurring group

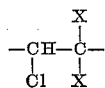

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides as a class, for example, those disclosed in British Pat. No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene. The invention also is applicable to mixtures of polyvinyl chloride in a major proportion with a minor proportion of other synthetic resins such as chlorinated polyethylene or a copolymer of acrylonitrile, butadiene and styrene.

The invention is of application to the stabilization of rigid polyvinyl chloride resin compositions, that is, resin compositions which are formulated to withstand high processing temperatures, of the order of 375° F. and higher, and plasticized polyvinyl chloride resin compositions of conventional formulation. Conventional plasticizers well known to those skilled in the art can be employed such as, for example, dioctyl phthalate, octyl diphenyl phosphate and epoxidized soybean oil.

In addition, advantageously stabilized are polymers, copolymers or terpolymers of polymerizable compounds having a plurality of double bonds, e.g., rubbery, conjugated diene polymerizates, such as homopolymerized 2,3-butadiene, 2-chlorobutadiene, or isoprene, and linear copolymers or terpolymers such as butadiene-acrylonitrile copolymer, isobutylene-butadiene copolymer, butadiene-styrene copolymer or 2-chloro-butadiene vinylidene cyanide-acrylonitrile terpolymer or acrylonitrile-butadiene-styrene terpolymer and other diethylenically unsaturated compounds, such as methyl methacrylate-diallyl methacrylate copolymer or butadiene-styrene-divinylbenzene terpolymer.

Polymerized materials prepared by subsequent reaction of preformed vinyl polymers, e.g., polyvinyl alcohol, the polyvinyl acetals such as polyvinyl formal or polyvinyl butyral, or completely or partially hydrolyzed polyacrylonitrile, are likewise modified in properties by the polymeric esters to give polymeric materials of enhanced stability.

Fibrous cellulosic products are examples of natural polymeric materials which are advantageously stabilized by the polymeric ester. Another class of natural polymers with which the polymeric esters are beneficially used are the natural gums and natural rubber. A class of synthetic polymeric materials with which the polymeric ester are very useful comprises the cellulose derivatives, e.g., the cellulose esters such as cellulose acetate, cellulose triacetate, or cellulose acetate butyrate, the cellulose ethers such as methyl or ethyl cellulose, cellulose nitrate, carboxymethyl cellulose, cellophane, rayon, regenerated rayon, etc. The polymeric esters may be incorporated into films of such cellulose derivatives by adding them to the solutions from which the films are cast or into the melts from which the fibers are extruded.

The polymeric esters of thiodipropionic acid are particularly suited to stabilize the liquid resin compositions of the polyester type against premature polymerization during storage. Polyester resins with which the polymeric esters are useful are either the linear polyesters which are obtained by the reaction of one or more polyhydric alcohols with one or more α,β-unsaturated polycarboxylic acids, alone or in combination with one or more saturated polycarboxylic acid compounds, of the cross-linked polyester resins which are obtained by reacting the linear polyester with a compound containing a $CH_2=C<$ group.

Polyhydric alcohols which are used for the preparation of the presently stabilized polyester resin include those set out hereinbefore as useful in preparing the polymeric esters.

The polycarboxylic acid compounds used in preparing the presently stabilized polyester resins are, e.g., the α,β-unsaturated acids or the anhydrides or acyl halides thereof, the alkanedicarboxylic acids, anhydrides or acyl halides thereof; the cycloparaffin dicarboxylic acids, the aromatic dicarboxylic acids, the halogenated dicarboxylic compounds, and the like.

The cross-linking component of the polyester resin can be any compound containing the group $CH_2=C<$ and having a boiling point of at least 60° C. Among the numerous compounds employed for this purpose which may be mentioned are styrene, the nuclear or side-chained substituted styrene, other vinyl-substituted hydrocarbons; the olefinic carboxylic acids and the esters, nitriles, amides and anhydrides thereof; vinyl esters; olefinic ketones; alkenes such as isobutylene and 2-pentene; the olefinic ethers such as vinyl ethyl ether and vinyl isobutyl ether; vinyl-substituted heterocyclic compounds; olefinic aldehydes and esters of unsaturated alcohols.

The stabilizer may be added to the polyester compositions at any stage of processing after the esterification.

Also beneficially modified by the stabilizers of the invention are the polyamides, such as nylons obtained by the condensation of a diamine with a dicarboxylic acid, or polycaprolactam.

The polymeric esters of thiodipropionic acid are adjuvants for polymeric aldehydes, e.g., homopolymeric, high-molecular weight formaldehyde and for linear polymers obtained by the self-condensation of bifunctional compounds generally, e.g., the polyethers which are derived by the self-condensation of dihydric alcohols such as ethylene glycol, propylene glycol or hexamethylene glycol; the polyesters which are obtained by the self-condensation of hydroxy acids such as lactic acid or 4-hydroxybutyric acid, 6-hydroxycaproic acid, the polyamides which are prepared by the self-condensation of amino carboxylic acids such as 4-aminobutyric acid or 6-aminocaproic acid; the polyanhydrides which are formed by the self-condensation of dicarboxylic acids such as sebacic acid or adipic acid, etc.

The polyurethanes comprise another class of polymeric materials which are beneficially modified by the polymeric esters. Essentially, the polyurethanes are condensation products of a diisocyanate and a compound having a molecular weight of at least 500 and preferably about 1500–5000, and at least two reactive hydrogen atoms, i.e., hydrogen atoms determinable by the Zerewitinoff method.

Broadly, any of the prior art polyesters, polyisocyanate - modified polyesters, polyesteramides, polyisocyanate - modified polyester amides, alkylene glycols, polyisocyanate - modified alkylene glycols, polyoxyalkylene glycols and polyisocyanate - modified polyoxyalkylene glycols, etc., having free reactive hydrogen atoms, free reactive carboxylic and/or especially hydroxyl groups may be employed for the production of polyurethanes. Moreover, any organic compound containing at least two radicals selected from the class consisting of hydroxyl and carboxyl groups may be employed.

The organic polyisocyanates useful for the production of the polyurethanes include ethylene diisocyanate,
ethylidene diisocyanate,
propylene-1,2-diisocyanate,
butylene-1,3-diisocyanate,
hexylene-1,6-diisocyanate,
cyclohexylene-1,2-diisocyanate,
m-phenylene diisocyanate,
2,4-toluylene diisocyanate,
1,6-toluylene diisocyanate,
3,3′-dimethyl-4,4′-biphenylene diisocyanate,
3,3′-dimethoxy-4,4′-biphenylene diisocyanate,
3,3′-diphenyl-4,4′-biphenylene diisocyanate,
4,4′-biphenylene diisocyanate,
3,3′-dichloro-4,4′-biphenylene diisocyanate,
triphenylmethane triisocyanate,
1,5-naphthalene diisocyanate or polyisocyanates in a blocked or inactive form such as the bis-phenyl carbamates of toluylene diisocyanate, p,p′-diphenylmethane diisocyanate, p-phenylene diisocyanate and 1,5-naphthalene diisocyanate, etc.

In practice, the polyurethane plastics are produced by bringing together the organic compound which contains at least 2 reactive hydrogen atoms and is capable of forming polyurethanes, with the polyisocyanate and an activator mixture. The latter is made of at least one cross-linking agent and/or an accelerator and may contain, if desired, added water or an aqueous solution. The addition of such an activator mixture to the mixture of polyisocyanates and active hydrogen compound initiates the cross-linking action needed to obtain homogeneous plastics or the cross-linking and foaming action necessary to obtain foam plastics. Useful cross-linking agents include water or aqueous solutions for foamed plastics and the polyalcohols, such as ethylene glycol, propylene glycol, butylene glycol, diethylene glycol, triethylene glycol, glycerol, etc., for nonporous plastics; and useful accelerators include the tertiary amines (either individually or in mixture) such as dimethylhexahydroaniline, diethylhexahydroaniline, reaction products of N,N′-diethylaminoethanol and phenylisocyanate, esteramines, etc.

When the presently provided stabilized polyurethane resin is to be used for the preparation of coatings or films, the compound is advantageously added to a solution of the polyurethane previous to hardening of the film or application of the coating.

The above material also includes those plastics which are in combination with other material, for example, with fillers such as flour, cotton, shredded or chopped cloth, chopped canvas, paper pulp forms, asbestos, powdered mica, calcium carbonate, carbon, graphite, quartz, diatomaceous silica, fibrous glass, barytes, calcium silicate, iron, barium sulfate, litharge, and clay; plasticizers such as phthalates, phosphates, esters including adipates, azelates and sebacates, polymeric plasticizers including polyesters of adipic, azelaic, and sebacic acid with glycols terminated with long-chain fatty acids, epoxy, fatty acid esters, esters of glycols such as phthalyl glycolates, sulfonamides; secondary plasticizers including hydrocarbons, chlorinated hydrocarbons, nitrated hydrocarbons; polymerizable plasticizers; stabilizers such as inorganic acid derivatives including basic lead carbonate, tribasic lead sulfate, dibasic lead phosphite, sodium carbonate, di-, and trisodium phosphate and the salts of polyphosphoric acid partial esters; colorants such as the dyes, the organic pigments and inorganic pigments; and reinforcing fibers.

The polyester of thiodipropionic acid alone or with other stabilizers are incorporated in the polymer in suitable mixing equipment by any of the known blending techniques used for the particular polymer. If the polymer has a melt viscosity which is too high for the desired use, e.g., polypropylene, the polymer can be worked until its melt viscosity has been reduced to the desired range before addition of the stabilizer. The polymers can be worked into the desired shape, such as by milling, calendering, extrusion or injection molding or fiber-forming.

The following examples in the opinion of the inventor represent the best embodiments of the invention.

EXAMPLE 1

A polymeric ester of thiodipropionic acid was evaluated for its stabilizing effect on polypropylene. The polymeric ester used was the polymeric ester of thiodipropionic acid and neopentyl glycol, containing isodecyl end group of Example D. 0.3% stabilizer was used. The polymeric ester of thiodipropionic acid was weighed and dispersed by hand stirring in powdered previously unstabilized polypropylene (Profax 6501), reduced specific viscosity (RSV) 3.0, melt index 0.4, ASTM D–1238–57T at 190° C. The mixture was placed on a 2-roll mill and fluxed for 5 min. at 170±2° C. and sheeted off. Pieces cut from the mill sheet were subjected to an oven ageing test in an air circulating oven at 150° C., heated flat on aluminum foil. Samples were removed daily and examined for cracking or powdering, either of which constitutes failure. Other samples were exposed to a bank of 5–40 watt fluorescent light bulbs at a distance of 6 inches from the bulbs.

The data obtained in the above oven ageing test showed that the polypropylene containing the polymeric ester did not fail until about 49 hours, whereas the polypropylene alone failed after only 5 hours. Thus, it is seen that the polymeric ester of thiodipropionic acid enhanced the resistance of the polypropylene to deterioration in physical properties upon prolonged exposure to heat.

The data obtained in the light test showed that the polypropylene containing the polymeric ester did not become brittle until after 59 hours, whereas the polypropylene became brittle after about 18 hours.

In addition, where the polymeric esters are evaluated using the standard tests set out in U.S. Pat. No. 3,255,136, namely, the heat stability test at 205° C., compression molding at 190° C. (resistance to embrittlement and loss of plasticity). Weatherometer (resistance to light deterioration), and compression molding at high temperature, 287° C. (resistance to embrittlement and loss of plasticity at high temperatures). The data that are obtained show that the polymeric esters enhance the resistance of polypropylene to deterioration in physical properties upon prolonged exposure to heat and light, and enhance the resistance to embrittlement and loss of plasticity, at low and high temperatures.

EXAMPLE 2

A two-component stabilizer system, namely, a polymeric ester of thiodipropionic acid and a phenol, was evaluated against the stabilizing effect of the various components thereof, taken singly and in pairs. The stabilizers used were 0.1 part 2,6-di-tert-butyl-p-cresol, and 0.3 part of the polymeric ester of Example D, thiodipropionic acid and neopentyl glycol containing isodecyl end groups in a molar ratio of about 2.2:1:2, respectively. The stabilizers were weighed and dispersed by hand stirring in powdered previously unstabilized polypropylene (Profax 6501), and sheets were prepared as described in Example 1.

The data obtained in the oven ageing test at 150° C. described in Example 1, show that polypropylene containing the polymeric ester and phenol had not failed after 143 hours, whereas the polypropylene alone failed at 5 hours. Thus, the stabilizer system of the invention provides excellent resistance to deterioration in physical properties upon prolonged exposure to heat.

EXAMPLES 3 AND 4

Two stabilized polypropylene compositions were prepared, using varying quantities of stabilizing systems in accordance with the invention. A blend of phosphite and phenol was prepared before incorporation with metal salt, the polymeric ester of thiodipropionic acid and the resin, to prevent separation of the bisphenol. 100 g. 4,4'-butylidenebis(2-tertiary-butyl-5-methyl-phenol), 150 g. iso-octyl diphenyl phosphite, and 0.5 g. calcium hydroxide were stirred and heated at 120 to 125° C. for three hours, at atmospheric pressure, without stripping to remove phenol. At the end of this time, a clear brown solution had formed, and this solution remained homogeneous at room temperature. As a test to show that transesterification had occured, when one half of the reaction mixture was heated at 125 to 135° C. under reduced pressure, phenol was distilled off. The other half of the unstripped 40% concentrate (content 40% total, 4,4'-butylidenebis (2-tertiary-butyl-5-methyl-phenol) was combined with 50 g. more of iso-octyl diphenyl phosphite and of zinc 2-ethylhexoate, to yield a stabilizer blend of the following composition:

| | Parts |
|---|---|
| 4,4'-butylidenebis(2-t-butyl-5-methylphenol) | } 0.1125 |
| Iso-octyl diphenyl phosphite | |
| Zinc 2-ethylhexoate | 0.0375 |

This composition was blended with polypropylene (Profax 6501) and with the neopentyl glycol-thiodipropionate esters as prepared in Examples D and E, in the amounts indicated in the Table below, using the procedure of Example 1, and the resistance to ageing and other properties evaluated by the oven ageing test at 150° C. The test results are given below.

TABLE I

| Stabilizer system | Example No. 3 | Example No. 4 |
|---|---|---|
| Mixture of 4,4'-butylidenebis (2-t-butyl-5-methylphenol) iso-octyl diphenyl phosphite, Zinc 2-ethyl hexoate | 0.15 | 0.15 |
| Di-n-dodecyl neopentyl glycol thiodipropionate of Example E | 0.3 | |
| Heat ageing, ° C. | 150 | 150 |
| Di-isodecyl neopentxl glycol thiodipropionate of Example D | | 0.3 |
| Molded 20 mil specimens: Days to Failure | 27 | 43 |
| Molded plaques 40 x 30 x 3 mm.: Appearance after 3 days | (¹) | (¹) |
| Compatibility with phenol phosphite and metal salt | Yes | Yes |

¹ Clear colorless, no bloom.

The above data clearly show that Samples 3 and 4 had excellent heat stability and color retention after ageing at 150° C., without development of bloom, the reduction in melt viscosity thereof was small, and resistance to embrittlement and loss of plasticity at low and high temperatures and resistance to light deterioration, were all rated as excellent.

EXAMPLES 5 TO 7

Three stabilizer systems were prepared, containing 3 parts each of one of a variety of polymeric esters of thiodipropionic acid. The other stabilizers present were 1 part 4,4'-thiobis-(2-tertiary-butyl-5-methylphenol), 2.75 parts iso-octyl diphenyl phosphite, and 1.25 parts zinc 2-ethylhexoate. These were combined with polypropylene (Profax 6501), in the proportion of 0.8 part total stabilizers per 100 parts of resin. The stabilizers were prepared, weighed and dispersed in the powdered polypropylene according to the procedure set forth in Example 1. Heat ageing resistance at 150° C. was then tested, with the following results:

TABLE II

| | Polymeric thiodipropionate | Heat ageing, 20 mil specimens, 150° C. | |
|---|---|---|---|
| | | Days to failure | Color, 2 days |
| Example No.: | | | |
| 5 | Polymeric ester of hexanediol-1,6 and thiodipropionic acid, Example A. | Over 20 | Colorless. |
| 6 | Polymeric ester of triethylene glycol and thiodipropionic acid of Example B. | do | Do. |
| 7 | Polymeric ester of neopentyl glycol and thiodipropionic acid of Example C. | do | Do. |

Excellent resistance to ageing at elevated temperatures was evidenced. Heat stability, resistance to embrittlement and loss of plasticity, at low and high temperatures, and resistance to light deterioration, were all rated as excellent.

EXAMPLES 8 TO 10

A variety of stabilizer systems containing a polymeric ester of thiodipropionic acid and a polyol were prepared and were incorporated in AVISUN polypropylene melt index 2.7 ASTM D1238–57T at 230° C., using the method described in Example 1.

The transesterified phosphite used was the reaction product of 1,1,3-(3-t-butyl-6-methyl-4-hydroxyphenyl)

butane (1 mole), triphenyl phosphite (3 moles), and tridecyl alcohol (6 moles), heating at 120–130° C. for 3 hours and stripping phenol to 160° C. at 20 mm. (transesterified phosphite A).

Samples were prepared as described in Example 1, having a thickness of 5 mils or 20 mils. The parts of stabilizer given in Table III below are per 100 parts of polypropylene. The samples were oven aged at 140° C. and 150° C. in a through flow air stream at a flow rate of 1000 ft. per minute, in the tubular oven described in the paper entitled "A Study of the Accelerated Ageing of Vinyl Compounds in a Modified Testing Oven," by Markus Royen of Apex Tire and Rubber Company, presented before a joint meeting of ASTM Committees D–11 and D–20 on June 25, 1959, and before the annual convention of the Wire Association in Cleveland, Ohio, on Oct. 14, 1959. The tubular oven provides for a controllable and uniform air flow over the sample tested with minimum turbulence, simple adjustment of temperature and air flow conditions, and sample isolation to eliminate contamination. In addition, the various samples were submitted to the circulating air oven ageing test at 150° C. described in Example 1.

The data obtained in these tests are set out in Table III below.

TABLE III

| Stabilizer system | Example No. | | |
|---|---|---|---|
| | 8 | 9 | 10 |
| Polymeric ester of thiodipropionic acid and neopentyl glycol containing iso-decyl chain end groups of Example D | 0.25 | 0.25 | 0.3 |
| Transesterified phosphite A, 88.5%; plus diphenyl phosphite, 11.5% | 0.25 | 0.17 | |
| Zinc octoate | | 0.08 | 0.025 |
| Transesterified phosphite from 4,4′-butylidenebis (6-t-butyl-m-cresol) (1 mole); triphenyl phosphite (2 moles); tridecyl alcohol (4 moles) | | | 0.125 |
| Hours to failure through flow tubular oven ageing: | | | |
| 5 mil sample at: | | | |
| 140° C | 525 | 622 | |
| 150° C | 260 | 336 | |
| 20 mil sample at: | | | |
| 140° C | 790 | 1,030 | |
| 150° C | 366 | 426 | |
| Air-circulating oven ageing at 150° C. (5 mil sample) | 502 | 694 | 1,044 |

The data obtained shows that this polymeric ester of thiodipropionic acid when used with conventional heat stabilizers imparts to polypropylene excellent resistance to heat deterioration.

EXAMPLES 11 AND 12

The polymeric esters of thiodipropionic acid are evaluated for their stabilizing effect on polyethylene (polyethylene of melt flow index 2).

The polymeric ester is incorporated into samples of the polyethylene by milling the polyethylene and the polymeric esters at 140° C. The compositions produced are pressed at 150° C. into sheets 0.005 in. thick.

The sheets are oven aged at 160° C. for various lengths of time.

The polymeric esters of thiodipropionic acid and amounts incoporated into the polyethylene are set forth in Table IV below.

EXAMPLES 13 AND 14

The mixed barium-cadmium salts of a polymeric ester of thiodipropionic acid and a mixture of barium-cadmium-um laurate and a polymeric ester are evaluated for their stabilizing effect on polyvinyl chloride resin (Solvic 239, a suspension polymer with a k value of 70) plasticized with 50 parts of di-2-ethylhexyl phthalate per 100 of resin.

The polymeric ester is incorporated into the polyvinyl chloride, along with one or more metal salt stabilizers, by milling mixtures thereof on a 2-roll mill at 150° C. to form rough sheets from which are molded finished sheets of about 1 mm. thickness. Pieces of about 1 x 3 cm. are cut from the so-formed film and are oven aged at 177° C. and samples removed at 15-minute intervals.

The polyesters of thiodipropionic acid and amounts incorporated into the polyvinyl chloride are set out in Table V below.

TABLE V

| | Polymeric ester of thiodipropionic acid | Metal salt and amount | Results |
|---|---|---|---|
| Example No.: | | | |
| 13 | The polymeric ester of thiodipropionic acid and diethylene glycol of Example C, 0.5%. | Barium laurate, 0.75; cadmium laurate, 0.5 | Moderate discoloration, 45 min.; severe discoloration, 75 min. |
| Control A | | Barium laurate, 0.75; cadmium laurate, 0.5. | Moderate discoloration, 30 min.; severe discoloration, 45 min. |
| 14 | The mixed barium-cadmium salts of the ester of Example H, 2.5%. | | Moderate discoloration, 45 min.; severe discoloration, 75 min. |

EXAMPLE 15

The polymeric ester of Example A, namely, the polymeric ester of thiodipropionic acid and hexanediol-1,6 is evaluated for its stabilizing effect on polyvinylchloride homopolymer, (Geon 103 Ep).

A series of formulations are prepared by blending the polymeric ester with dibutyltinbis(iso-octyl maleate) and calcium stearate with the polyvinyl chloride and the mixture is fused on a two-roll mill and then heated in an oven at 190° C. to test heat stability. The discoloration and clarity are noted and the color is reported in the table below.

TABLE VI

| | Example 15 | Control B | Control C |
|---|---|---|---|
| Polyvinyl chloride resin | 150 | 150 | 150 |
| Polymeric ester of thiodipropionic acid and hexanediol-1,6 | 0.1 | | |
| Dibutyltinbis (iso-octyl maleate) | 0.3 | 0.3 | |
| Calcium stearate | 0.75 | 0.75 | |
| Heating at 190° C.: | | | |
| Moderate discoloration (yellow), minutes | 45 | 30 | |
| Severe discoloration (brown), minutes | 105 | 75 | (¹) |

¹ Less than 15 minutes.

The results indicate that the stabilizer system containing the polymeric ester of thiodipropionic acid is effective in enhancing the resistance of polyvinyl chloride to discoloration upon being heated to 190° C. for various lengths of time.

EXAMPLES 16 AND 17

Polymeric ester of thiodipropionic acid are evaluated for their stabilizing effect on polyoxymethylene-diacetate (M.W. about 30,000).

The polymeric ester of thiodipropionic acid is incorporated into the polyoxymethylene-polyacetate with the phenol listed in Table VII by mixing a 1% solution of the polymeric ester in acetone with the polyoxymethylene

TABLE IV

| | Polymeric ester of thiodipropionic acid | Amount, percent | Results |
|---|---|---|---|
| Example no.: | | | |
| 11 | The zinc salt of the polymeric ester of thiodipropionic acid and hexanediol-1,6 of Example G. | 0.025 | Each composition has improved stability after it is heat aged in an oven for various times up to 10 hours at 160° C. |
| 12 | The polymeric ester of thiodipropionic acid and 1,4-cyclohexane dimethanol containing 2-ethyl hexyl chain end groups. | 0.05 | | polyacetate and phenol, and allowing the resulting mixture to air dry to remove the acetone.

The compositions so obtained are formed in a sheet 40 x 30 x 3 mm. and the thermal stability ratings of the sheets are determined by measuring the weight loss of the polyacetal composition on heating in air for 30 minutes at 222° C., as well as the weight loss of the unstabilized polyacetal when subjected to this heat treatment.

The polymeric ester is incorporated into samples of the nitrile rubber along with a phenol by milling for a few minutes on cold rolls.

The resulting crepes are tested for oxidation resistance, measured by oxygen uptake as described in Examples 18 and 19.

The polymeric esters of thiodipropionic acid and phenols, and amounts that are incorporated into the nitrile rubber are set out in Table IX below.

TABLE IX

| Example No.: | Polymeric ester of thiodipropionic acid and amount | Phenol and amount | Results |
|---|---|---|---|
| 20 | The polymeric ester of thiodipropionic acid and octamethylene glycol. | 5,6,5',6'-tetrahydroxy-3,3,3',3'-tetramethyl spirodiindene, 0.5% (Baker, J. Chem. Soc. 1934, p. 1,678). | Each composition has improved resistance to oxidation over the unstabilized nitrile rubber. |
| 21 | Diglycerol-1,3-propylene glycol thiodipropionate. | 5,5'-dihydroxy-3,3,3',3',6,6'-hexamethyl spirodiindene, 0.5% (from o-cresol and acetone, M.P. 245-247° C.). | |

The polymeric esters of thiodipropionic acid and phenols and amounts of each incorporated into the polyoxymethylene polyacetate are set out in Table VII below.

EXAMPLES 22 AND 23

Polymeric esters of thiodipropionic acid are evaluated for their stabilizing effect on high impact polystyrene

TABLE VII

| Example No.: | Polymeric ester of thiodipropionic acid and amount | Phenol and amount | Results |
|---|---|---|---|
| 16 | The polymeric ester of thiodipropionic acid and diethylene glycol of Example C., 0.1%. | 2,2'-methylenebis (4-methyl-6-tert-butyl phenol) 0.3%. | Each composition has improved stability after it is heated for 30 min. at 222° C. over the unstabilized polyacetal. |
| 17 | The polymeric ester of thiodipropionic acid and pentaerythritol, 0.1%. | 4,4'-methylenebis (2,6-di-tert-butyl phenol) 0.3%. | |

EXAMPLES 18 AND 19

Polymeric esters of thiodipropionic acid are evaluated for their stabilizing effect on polybutene-1.

The polymeric ester and a phenol are incorporated into samples of the polybutene-1 by mastication at 150–160° C. under nitrogen, using the mixing chamber of a Baker Perkins Vertical Masticator, for 10 min. The sample is pressed to a thickness of 0.005 in. at 178° C. and then small samples of the 0.005 in. sheet are placed on glass wool in a glass bulb which contain some Type 5A "Linde" (registered trademark) molecular sieves to absorb gaseous products of oxidation and which is connected by a U-tube containing mercury to another glass bulb. ("Linde" molecular sieves are synthetic zeolites.) Both bulbs are filled with air, then sealed and the apparatus placed in a vapor thermostat at 140° C. Movement of the mercury indicates oxidation of the polybutene-1, and the time in the vapor thermostat at 140° C. until a notable rate of movement of the mercury is apparent is measured.

The polymeric esters of thio-dipropionic acid and phenols and amounts that are incorporated into the polybutene-1 are set out in Table VIII below.

resin containing 10% elastomer, unstabilized butadiene-styrene resin.

The polymeric ester with a phenol is incorporated into samples of the polystyrene resin by dissolving the resin in chloroform and then adding the stabilizers, after which the mixture is cast on a glass plate, and the solvent evaporated to yield a uniform film. This is removed and cut up, and then is pressed for 7 min. at a temperature of 163° C. and a pressure of 2000 p.s.i. into a sheet of uniform thickness (25 mil.). The sheets are cut into strips 4 x 0.5 inches.

A portion of the strips are measured for length of elongation in the Instron Tensile Tester. The remaining portion of the strips are aged in a forced draft oven for six weeks at 75° C. and thereafter are tested for elongation.

The polymeric esters of thiodipropionic acid and phenols and amounts that are incorporated with the polystyrene resin composition are set forth in Table X below.

TABLE X

| Example No.: | Polymeric ester of thiodipropionic acid and amount | Phenol and amount | Results |
|---|---|---|---|
| 22 | The polymeric ester of thiodipropionic acid and 1,6-hexanediol of Example A, 0.5%. | 2,6-di-tert-butyl-p-cresol, 0.1%. | Each composition has improved elongation over the unstabilized polystyrene resin after it is heat-aged in an oven at 75° C. for 6 weeks. |
| 23 | The polymeric ester of thiodipropionic acid and neopentyl glycol containing n-dodecyl chain end groups of Example E. | 2,2'-thiobis (4,6-di-tert-butyl phenol) 0.1%. | |

EXAMPLE 24

The polymeric ester of thiodipropionic acid and neopentyl glycol, containing iso-decyl end groups of Example D, is evaluated for stabilizing effectiveness in inhibiting premature gelation of a propylene maleate-phthalate polyester resin dissolved in styrene, which has

TABLE VIII

| Example No.: | Polymeric ester of thiodipropionic acid and amount | Phenol and amount | Results |
|---|---|---|---|
| 18 | The polymeric ester of thiodipropionic acid and ethylene glycol containing butyl chain end groups, 0.5%. | 5,6,5',6'-tetrahydroxy-3,3,3',3'-tetramethyl spirodiindene, 0.5%. (Baker, J. Chem. Soc. 1934, p. 1,678). | Each composition has improved oxidation resistance as measured by oxygen uptake. |
| 19 | The polymeric ester of thiodipropionic acid and neopentyl glycol containing 2,2-dimethylpentyl chain end groups, 0.5%. | 5,5'-dihydroxy-3,3,3',3',6,6'-hexamethyl spirodiindene, 0.5% (from o-cresol and acetone, M.P. 245-247° C.). | |

EXAMPLES 20 AND 21

Polymeric esters of thiodipropionic acid are evaluated for their stabilizing effect on nitrile rubber.

a particularly light color and is used in the production of bowling balls and decorative items where appearance is important.

The polymeric ester is incorporated into samples of the propylene maleate-phthalate resin as a stabilizer for the mix by stirring at room temperature until the polymeric ester is dissolved in the resin. In addition, for purposes of comparison, 1,4-naphthoquinone and hydroquinone as used as stabilizers instead of the polymeric ester.

The samples so prepared are heated in an oven at 70° C. and color, the days to gelation during storage, and the Barcol hardness after addition of a catalyst and cure are noted.

The various compositions formed and the test results obtained are set out in Table XI below.

TABLE XI

|  | Control D | Example 24 | Control E | Control F |
|---|---|---|---|---|
| Polymeric ester of Example 1, percent |  | 0.1 |  |  |
| 1,4-naphthoquinone, percent |  |  | 0.05 |  |
| Hydroquinone, percent |  |  |  | 0.05 |
| Oven ageing at 70° C.: |  |  |  |  |
| Days to gelation | 6–7 | 15–16 | 15–16 | 12–13 |
| Color | (¹) | (¹) | (²) | (³) |
| Gardner color of resin syrup | (⁴) | (⁴) | 3–4 | 1–2 |
| Barcol hardness (after cure with 1% benzoyl peroxide for 1 hour at 90–100° C.) | 35–37 | 35–37 | 35–37 | 12–19 |

¹ Pale yellow.
² Amber.
³ Light yellow.
⁴ Less than 1.

As is seen from the above test results, the polymeric ester of thiodipropionic acid improves the resistance of the propylene maleate-phthalate resin mix dissolved in styrene to heat deterioration before curing, and extends storage stability of the resin without imparting an undesirable color to the resin, and without interfering with the subsequent cure of the resin. The 1,4-naphthoquinone, on the other hand, deleteriously affects color, and the hydroquinone adversely affects the curing of the resin, as seen from the Barcol hardness results.

Having regard to the foregoing disclosure, the following is claimed as the inventive and patentable embodiments thereof:

1. A polymer composition having improved resistance to deterioration in physical properties on exposure to light and heat, consisting essentially of an organic polymeric material selected from the group consisting of polyvinyl chloride, polystyrene, natural and synthetic rubbers, and styrenated polyesters and an amount within the range from about 0.005 to about 5% by weight sufficient to improve resistance to deterioration of the polymeric material of a polymeric ester of thiodipropionic acid and a polyol having more than one thiodipropionic acid unit and at least one polyol unit per molecule.

2. A polymer composition in accordance with claim 1 wherein the polymeric ester of thiodipropionic acid has the formula

wherein $n_2$ represents the number of thiodipropionic acid ester units in the chain and is a number within the range from one to about twenty, $n_1$ and $n_3$ are zero or one, the sum of $n_2+n_3$ is at least two, $Z_1$ and $Z_2$ are selected from the group consisting of hydrogen, hydrocarbon, oxyhydrocarbon, and thiohydrocarbon radicals having from one to twenty carbon atoms; acyl radicals having from two to twenty-one carbon atoms, a Group II metal, and OY, Y is a bivalent organic radical selected from the group consisting of hydrocarbon, oxyhydrocarbon, and thiohydrocarbon radicals having from two to about twenty carbon atoms, the polymeric ester having a total of from about eight to about sixty-six carbon atoms per sulfur atom.

3. A polymer composition in accordance with claim 2 in which the polymeric ester of thiodipropionic acid has the formula

wherein Y is as above and $n$ is within the range from about two to twenty.

4. A polymer composition in accordance with claim 2 in which the polymeric ester of thiodipropionic acid has the general formula

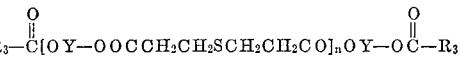

wherein Y is as above and $n$ is within the range from about two to twenty, and $R_3$ is selected from the group consisting of hydrocarbon radicals and epoxy hydrocarbon radicals having from one to twenty carbon atoms.

5. A polymer composition in accordance with claim 2 wherein the polymeric ester of thiodipropionic acid has the formula

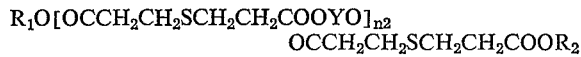

wherein Y and $n_2$ are as above and $R_1$ and $R_2$ are selected from the group consisting of hydrogen, a Group II metal, and hydrocarbon, oxyhydrocarbon and thiohydrocarbon groups having from one to about twenty carbon atoms.

6. A polymer composition in accordance with claim 5 wherein at least one of $R_1$ and $R_2$ is dodecyl.

7. A polymer composition in accordance with claim 5 wherein at least one of $R_1$ and $R_2$ is decyl.

8. A polymer composition in accordance with claim 5 wherein at least one of $R_1$ and $R_2$ is octadecyl.

9. A polymer composition in accordance with claim 1 wherein the polymeric material is polyvinyl chloride.

10. A polymer composition in accordance with claim 1 wherein the polymeric material is polystyrene.

11. A polymer composition in accordance with claim 1 wherein the polymeric material is an elastomer selected from the group consisting of natural and synthetic rubbers.

12. A polymer composition in accordance with claim 1 wherein the polymeric material is a styrenated polyester.

13. A polymer composition in accordance with claim 1 wherein the polymeric ester of thiodipropionic acid is a polymeric ester of neopentyl glycol and thiodipropionic acid.

14. A polymer composition in accordance with claim 1 wherein the polymeric ester of thiodipropionic acid is a polymeric ester of 1,2-propylene glycol and thiodipropionic acid.

References Cited

UNITED STATES PATENTS

| 3,115,465 | 12/1963 | Orhoff et al. | 260—45.95 |
| 3,181,971 | 5/1965 | Rayner | 117—232 |
| 3,194,776 | 7/1965 | Caldwell | 260—31.8 |
| 3,255,136 | 6/1966 | Hecker et al. | 260—23H |
| 3,033,814 | 5/1962 | Tholstrup | 260—45.85 |
| 3,160,680 | 12/1964 | Tholstrup et al. | 260—897 |
| 3,288,885 | 11/1966 | Green et al. | 260—857 |

DONALD E. CZAJA, Primary Examiner

R. A. WHITE, Assistant Examiner

U.S. Cl. X.R.

260—3, 45.7, 45.75, 45.8, 45.85, 45.9, 45.95, 810, 873